Aug. 7, 1923.
C. F. ANDERSON ET AL
1,464,020
WOODWORKING MACHINE
Filed Oct. 24, 1919
7 Sheets-Sheet 1
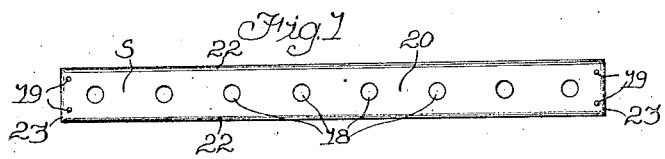
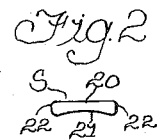
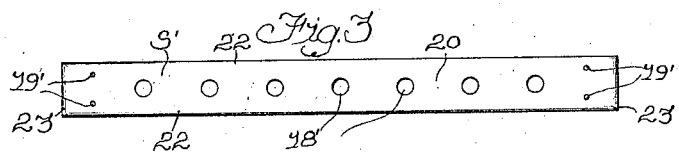
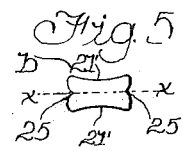
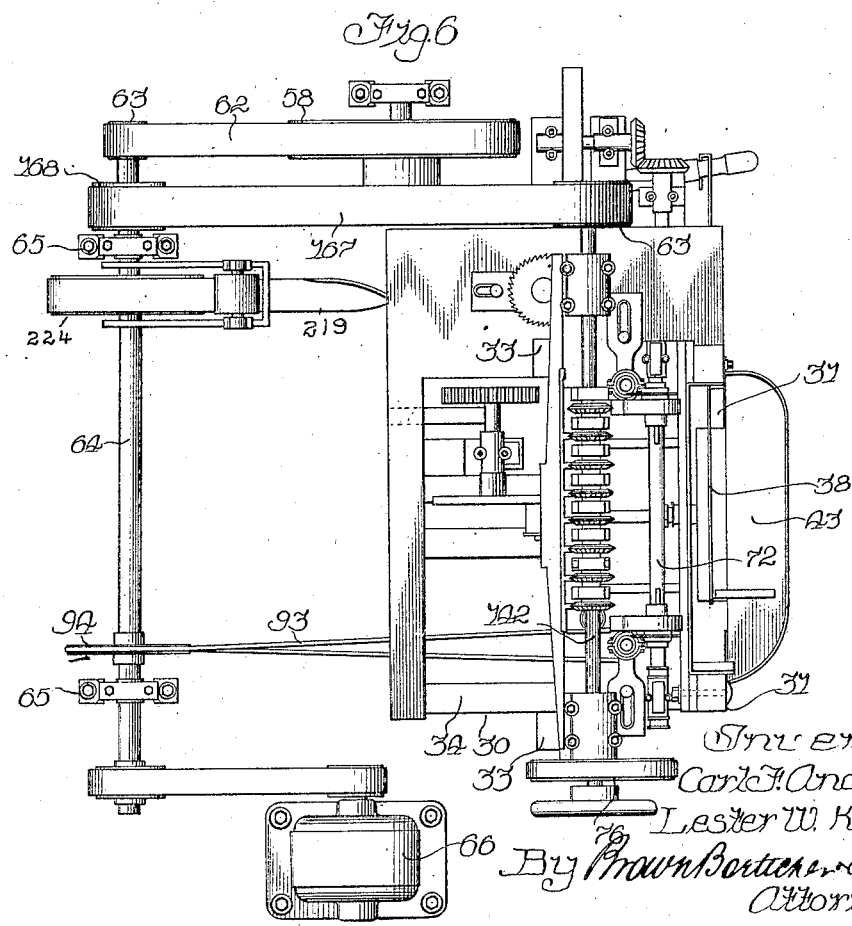

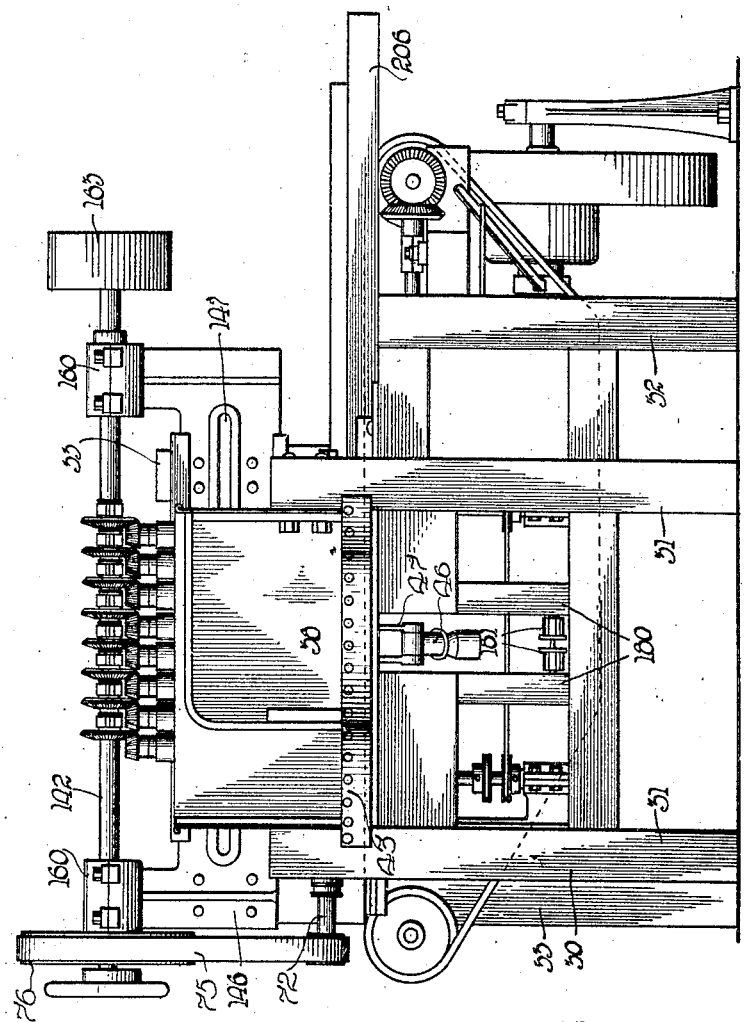

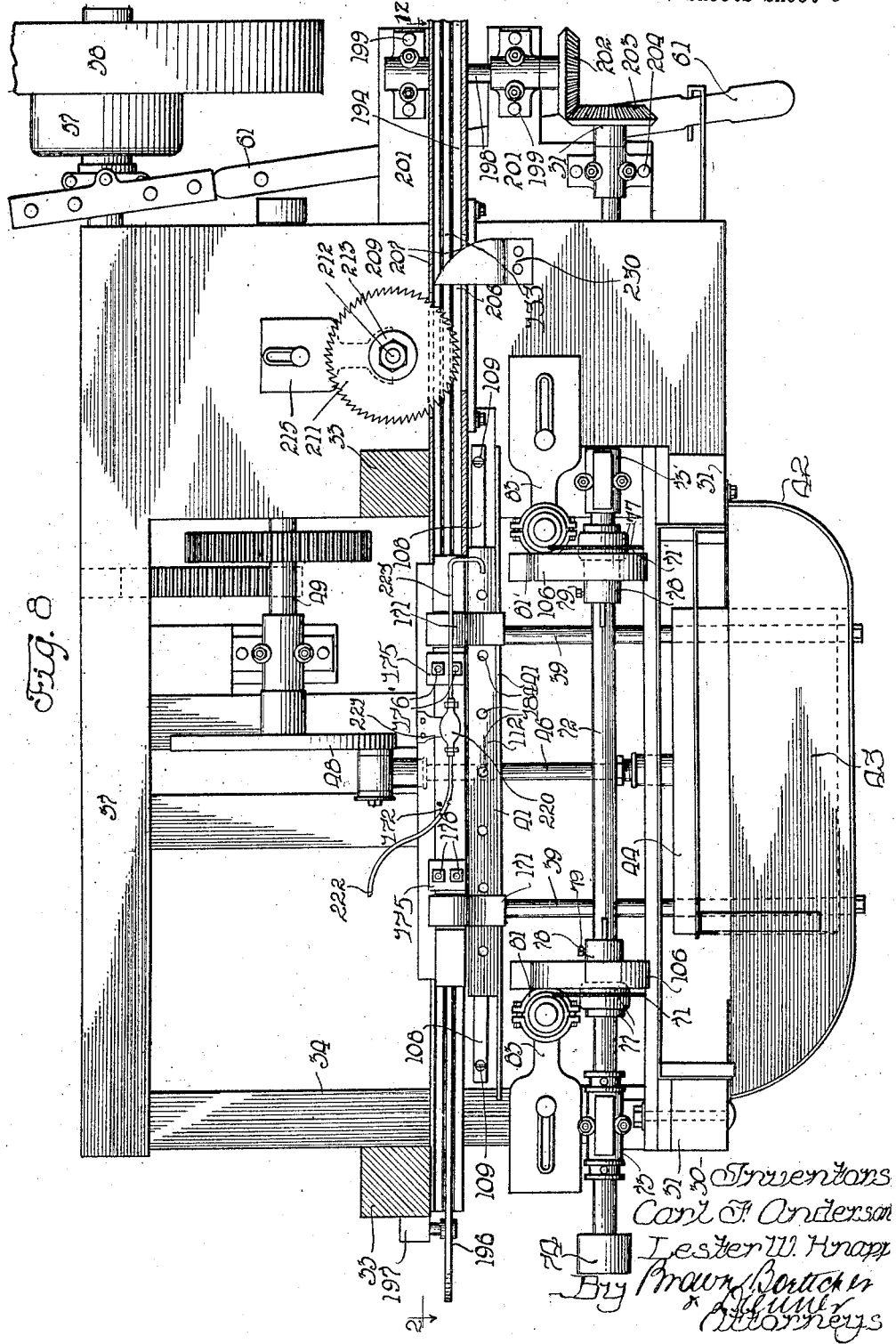

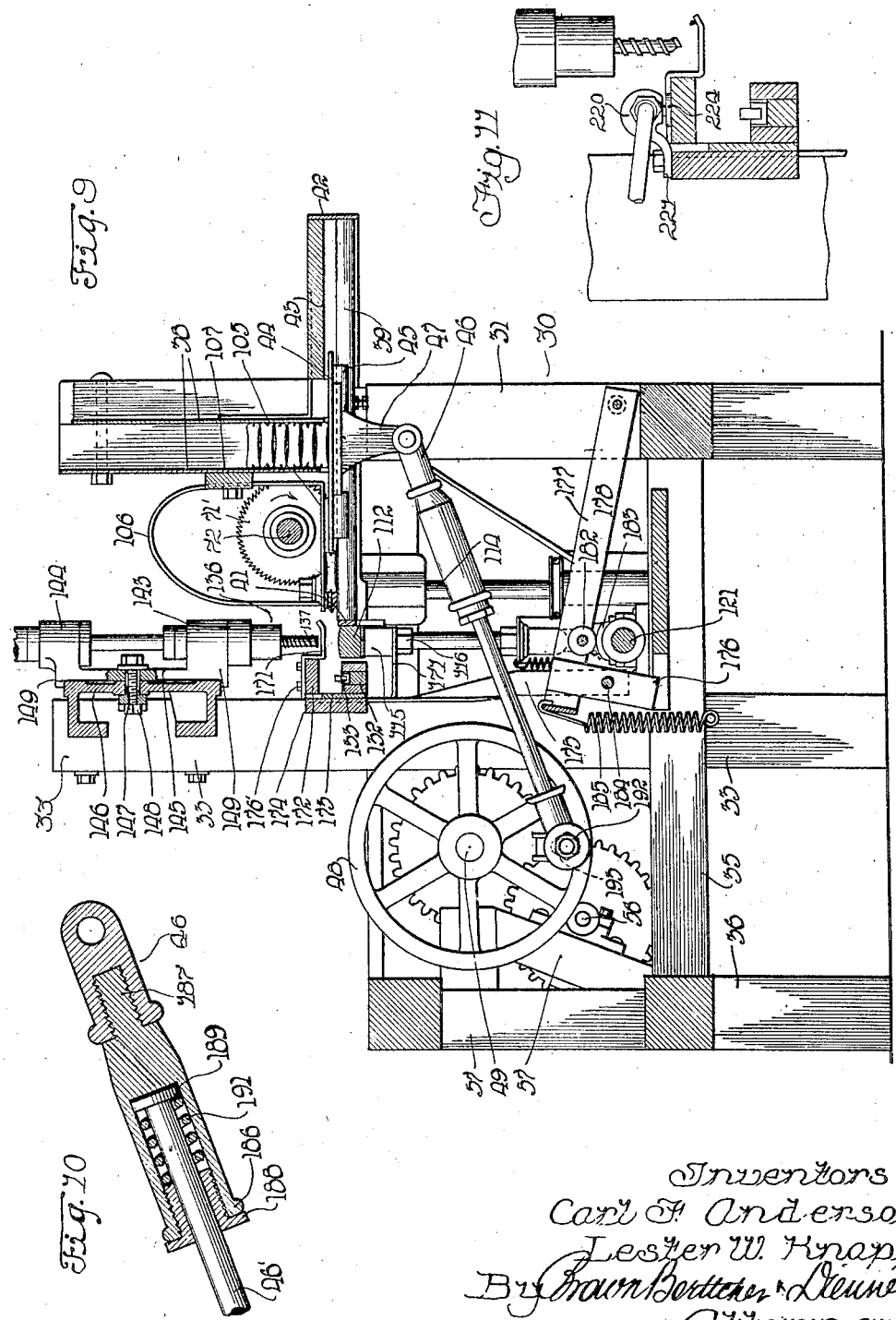

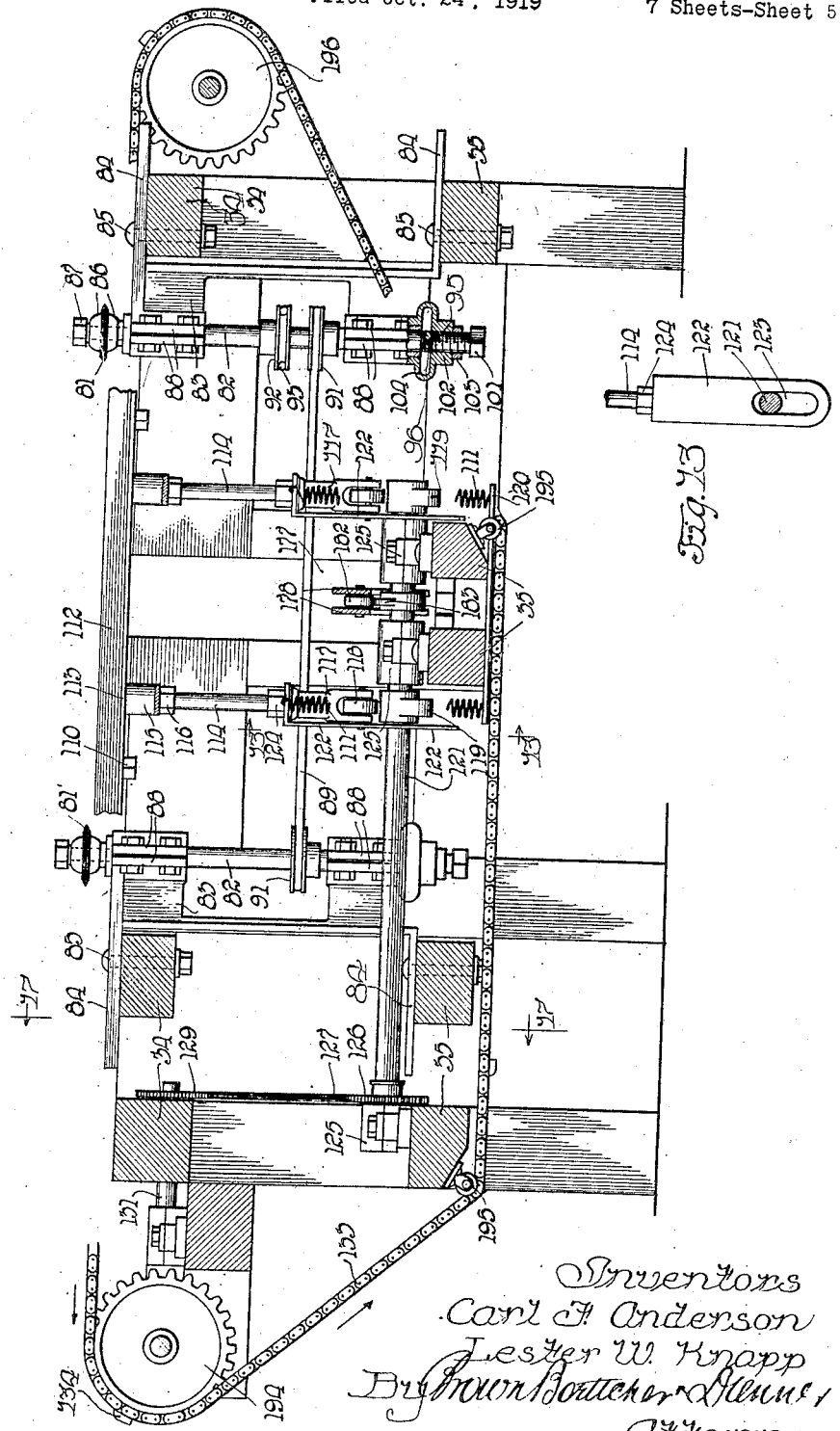

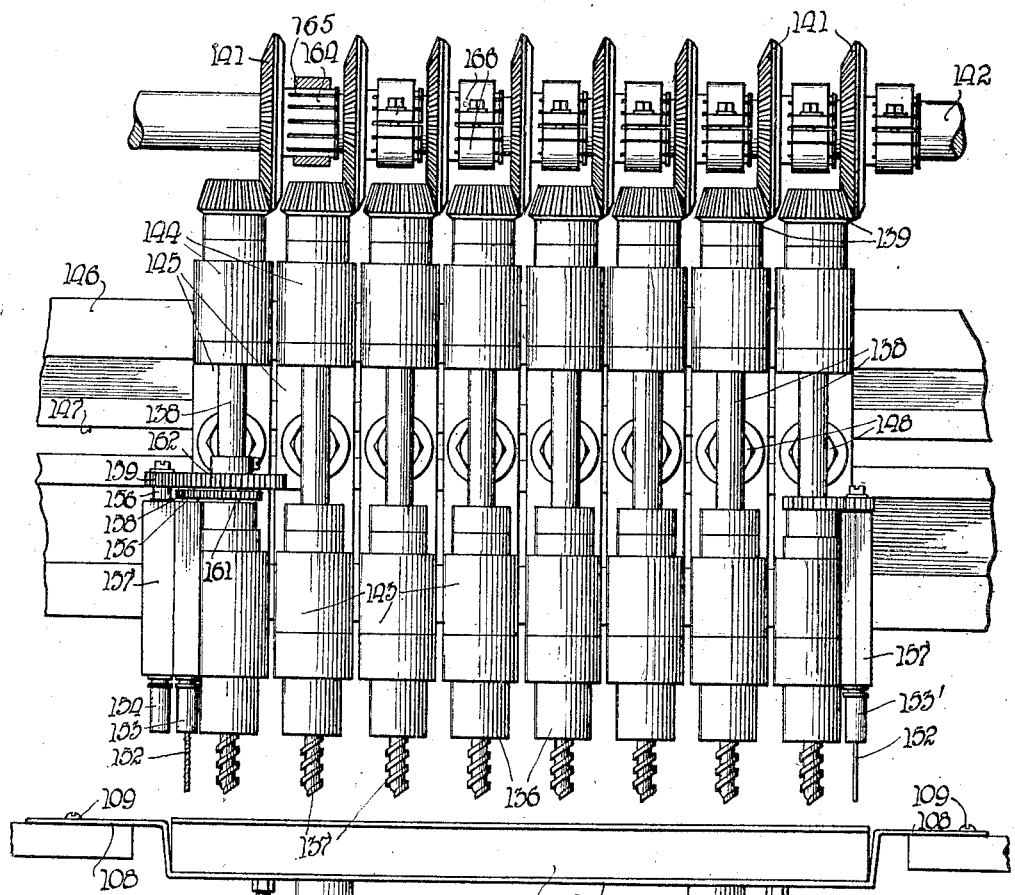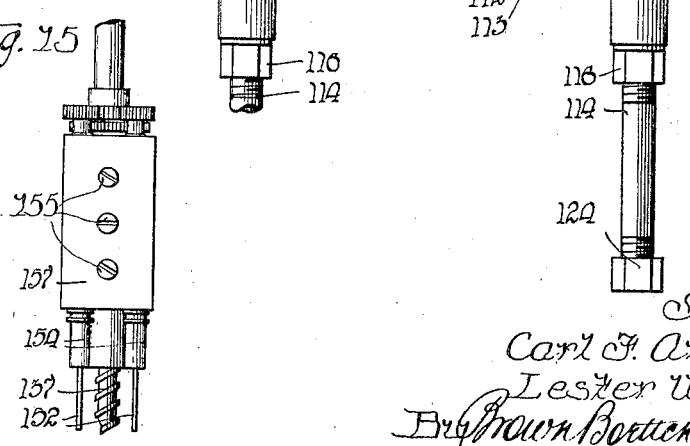

Aug. 7, 1923.

C. F. ANDERSON ET AL 1,464,020

WOODWORKING MACHINE

Filed Oct. 24, 1919

Inventor
Carl F. Anderson
Lester W. Knapp
By Brown Boettcher, Diener
Attorneys

Patented Aug. 7, 1923.

1,464,020

UNITED STATES PATENT OFFICE.

CARL F. ANDERSON, OF BROOKFIELD, AND LESTER W. KNAPP, OF BERWYN, ILLINOIS, ASSIGNORS, BY MESNE ASSIGNMENTS, TO CONLON CORPORATION, OF CICERO, ILLINOIS, A CORPORATION OF ILLINOIS.

WOODWORKING MACHINE.

Application filed October 24, 1919. Serial No. 332,953.

*To all whom it may concern:*

Be it known that we, CARL F. ANDERSON and LESTER W. KNAPP, both citizens of the United States, residing at Brookfield, in the county of Cook and State of Illinois, and Berwyn, in the county of Cook and State of Illinois, respectively, have invented a certain new and useful Improvement in Woodworking Machines (Case 2), of which the following is a full, clear, concise, and exact description, reference being had to the accompanying drawings, forming a part of this specification.

Our invention pertains to a wood-working machine.

The present construction of machine is designed primarily for making washing machine cylinder slats but it will be apparent from the appended detail description of the functions and operations of the machine, that the essential features of the invention are not of necessity limited to a machine for the making of these slats, but that they may be extended to and embodied in machines for making other articles of analogous form, or even articles of dissimilar form, but which require the performance of substantially the same operations in whole or in part. It will, therefore, be understood that though we have described the present machine as a special work machine, designed for the making of washing machine cylinder slats, we do not intend thereby to limit the invention to any specific field of utility, at least in so far as the particular form of product of the machine is concerned.

The primary object of the present invention is to provide a machine of the above type which will perform with the assistance of merely one or two operators a series of woodworking operations heretofore requiring several machines and numerous employees.

A secondary object of the invention is to provide a machine which will manufacture these slats with great rapidity, by reducing to a minimum the number of operations required per slat. This we accomplish by the novel method of performing each operation in turn upon a relatively large blank, preferably the size of a plurality of finished slats, and then as a final operation cutting this blank into a plurality of completed slat units.

Another object of the invention is to provide a wood-working machine wherein the wood-working elements can be quickly and easily adjusted for the purpose of readily adapting the machine to the production of different sizes of slats or slats of different characteristics.

The construction and operation of a preferred embodiment of our invention will be more apparent from the following detailed description taken in connection with the accompanying drawings, in which:

Figure 1 is a top plan view of the finished cylinder slat S.

Figure 2 is an end view of the same;

Figure 3 is a top plan view of the longer length of slat S' adapted for use in the cylinder covers;

Figure 4 is a plan view of the blank b;

Figure 5 is an end view thereof;

Figure 6 is a plan view of the machine, showing the countershaft and the driving connections with the machine;

Figure 7 is a front elevational view of the machine;

Figure 8 is an enlarged plan view of the same with the boring mechanism removed;

Figure 9 is a vertical sectional view taken transversely through the machine;

Figure 10 is a detail section of the spring connection in the connecting rod of the feeding cross-head.

Figure 11 is a detail section illustrating the mounting of the compressed air valve for the air cleaning jet.

Figure 12 is a vertical, fragmentary, sectional view taken approximately on the line 12—12 of Figure 8 and looking forwardly as indicated by the arrows.

Figure 13 is an enlarged detail section taken on the line 13—13 in Figure 12;

Figure 14 is an enlarged elevational view of the boring mechanism;

Figure 15 is a fragmentary end view of the same, illustrating the small, laterally spaced bit stocks.

Figure 16:
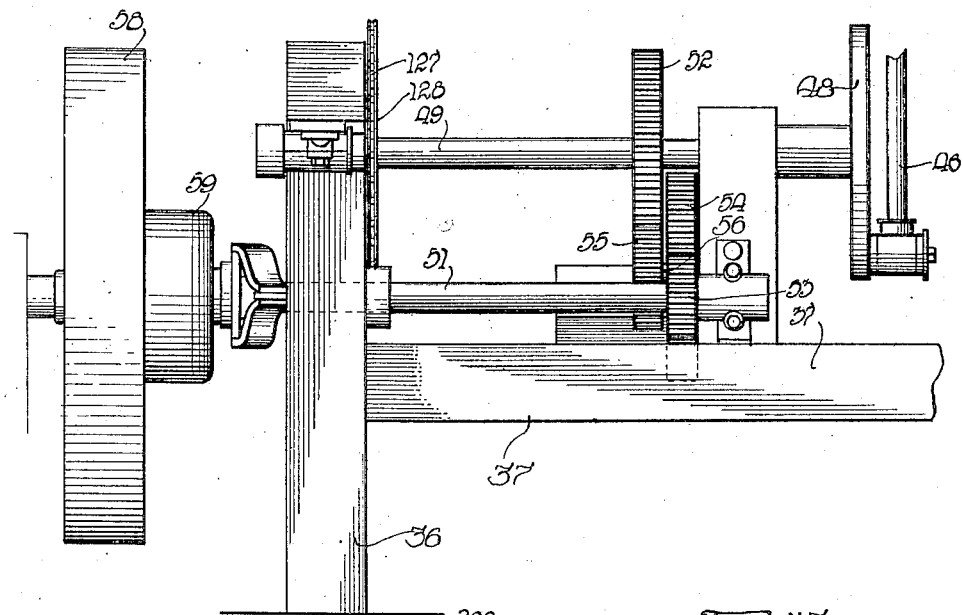
Figure 16 is a fragmentary elevational view of part of the transmission shafting.

The various functions and operations of the machine will be understood with greater facility by first making a brief description of the use and form of the slats which constitute the product of the machine.

The present form of slat is utilized in the making of clothes containers, such as are employed in rotary container types of domestic washing machines. These clothes containers are generally constructed in cylindrical form and usually consist of two substantially circular end heads which are joined by a plurality of cross slats spaced uniformly about the circumference of the heads. A cylinder of average size requires in the neighborhood of thirty slats, and it will hence be apparent that it is essential that the cost of the production of these slats be reduced to a minimum. According to the prior practice, these slats have been constructed by performing each separate operation upon the stock material by a separate machine, which obviously involves numerous employees and a sequence of operations requiring much handling and a loss of time.

In the preferred construction of cylinder there are also required two distinct lengths of slats, one length for building the cylinder proper, and the other length for completing the removable cover or door which closes the opening provided in the cylinder for the insertion of the clothes. This construction of cylinder is illustrated in our co-pending application Serial No. 318,080, filed August 18, 1919.

In Figures 1 and 2 of the accompanying drawings we have shown the shorter length of slat s for the making up of the circumference of the cylinder. Along the length of the slat are bored a plurality of relatively large holes 18, numbering in the present instance 8, which provide openings for circulating the wash water through the slats. At each end there are also bored two small nail holes 19 for the insertion of the brads or nails by which the slats are secured to the end heads of the cylinder. As shown in the end view of Figure 2, one surface of the slat is substantially flat, as indicated at 20, while the reverse surface is concave, as indicated at 21. The degree of curvature of the concave surface is shown exaggerated to be more apparent in the small figure. The radius of the concavity 21 is made substantially that of the radius of the cylinder heads so as to secure full surface contact of these slats on the cylinder heads. The lateral edges of the flat surface 20 are beveled or rounded as denoted at 22, as are also the end edges as denoted at 23, so as to present smooth exterior corners on the sides and ends of the slats.

Figure 3 illustrates the longer length of slat s' utilized in the making of the cylinder covers. This form of slat is a practical duplicate of the shorter length s, with the exception of the difference of lengths, which are substantially in the proportion illustrated,—and also in the difference of location of the nail holes 19'. It is also preferable in this type of slat to reduce the number of water circulating holes to seven, for reasons involved in the construction of the cylinder covers. It will be noted that in the cover slot s' the nail holes 19' are located considerably short of the ends of the slats. This difference of location of the nail holes is for the purpose of nailing these cover slats to the transverse cleat members forming the frame of the cover, which are usually spaced inwardly from the end heads of the cylinder.

The stock material of which these slats are constructed is fed to the machine in the form of blanks b, of the formation shown in Figures 4 and 5. The blank b is preferably slightly longer than either slat and is trimmed to length in the machine as we shall hereinafter describe. It is, of course, practicable to cut these blanks to precisely the length of the finished slat before feeding to the machine, but this practice is not as efficient and rapid and does not afford the same measure of accuracy for the reason that undersized blanks are liable to result. The blank b is substantially twice the thickness of the finished slat, and is hollowed on its upper and lower surfaces as indicated at 21', to provide the concave under surface 21 of the finished slat. The blanks are also formed with rounded V-shaped moulding grooves 25 extending along the side edges of the blank in the median plane thereof. The blank is adapted to be slit along this plane which is denoted by the line $x$—$x$ after the completion of the several operations thereon, and the rounding bevels in these moulding grooves are what form the beveled corners 22 of the finished slat.

Referring now to the detail construction of the machine, the supporting structure 30 (Figure 7) comprises three front supporting legs consisting of the pair of similar legs 31—31 and the relatively shorter leg 32. These three front legs in conjunction with the two central standards or uprights 33, which project upward considerably above the front legs (Figures 8 and 9) form a horizontal bed or working surface of open frame construction upon which are supported all of the wood working elements. The legs 31 and 32 and standards 33 are joined by the horizontal cross timbers 34 and 35, the upper timbers 34 completing the open frame bed or working surface. In the rear of the standards 33 are disposed a plurality of supporting legs 36 to which the cross timbers 34 and 35 are extended and joined for the purpose of forming a supporting structure 37 for supporting the counter-shaft and other power transmission mechanism for driving the different operating parts of the machine.

The blanks $b$ are fed into a narrow vertical hopper consisting of the front and rear plates 38, which are secured between the two front legs 31. From the hopper 38, the blanks $b$ are discharged onto two horizontal guide members 39, (Figure 9). These guide members are mounted at their rear ends in a narrow plate or bar 41, suitably secured to the frame of the machine, and are mounted at their front ends in a marginal strip 42 depending from the edge of the projecting ledge or shelf 43. Reciprocating beneath the hopper 38 is a feeding plate or cross-head 44, having semi-circular slides 45 which have guiding engagement on the guide rails 39. This cross-head is reciprocated by a pitman or connecting rod 46 which has pivotal connection to a bearing 47 depending from the bottom of the cross-head 44. The connecting rod 46 has pivotal connection to a crank wheel 48 which is mounted on a slow speed counter-shaft 49. As shown in Figure 16, the counter-shaft 49 is geared down through a double reduction gearing from the main power shaft 51, which has bearing support in the rear frame structure 37 and extends parallel to the counter-shaft 49. The double reduction gearing comprises the large gear 52 on the countershaft 49, the small gear 53 on the power shaft 51, and the intermediate double gear, consisting of the large and small gears 54 and 55 respectively, which are mounted on a stub shaft 56, carried on the frame standard 57 (Figure 9). The power shaft 51 carries a driving pulley 58 which drives the power shaft 51 through the intervention of a clutch 59. The operation of throwing this clutch in and out is effected by a long operating lever 61, which extends horizontally to a convenient position for operation at the front of the machine as illustrated in Figure 8. The pulley 58 is connected by a belt 62 to a smaller pulley 63 on the motor driven counter shaft 64 (Figure 6). The counter shaft is preferably located at the rear of the machine where it is supported in bearings 65, and is belted to a power motor 66.

Referring again to the illustration in Figure 9 of the cross-head 44, it will be noted that this cross head has motion in under the shelf 43, so as to enable the feeding edge of the cross-head to clear the discharge end of the chute or hopper 38. When this occurs the lowermost blank $b$ drops upon the guide rails 39, where it is engaged by the cross-head 44 on its return motion and is fed forwardly between two rotary crosscut saws 71 and 71'. These rotary saws are mounted on a common shaft 72, which extends transversely above the guide-rails 39 and has bearing support in bearings 73 and 73' on the frame of the machine as shown in Figure 8. The shaft 72 is provided with a driving pulley 74, which is adapted to be driven at a relatively high speed by a belt 75 (Figure 7), which extends up to a pulley 76 on the upper shaft 142 of the boring mechanism.

Each of the rotary saws 71 and 71' is carried between collars 77 which are mounted on a shiftable hub 78 adapted for sliding movement along the shaft 72. One of the collars 77 is made integral with the hub 78, while the other collar is threaded thereon to permit of removal of the saw. Each shiftable hub 78 is splined to the shaft 72 and is adapted to be rigidly held in any adjusted position by a set screw 79 or similar means. The function of the two rotary saws 71—71' is to trim off the ends of the blanks $b$ to cut the blanks down to the exact lengths desired for the finished slats. As we have previously described, two distinct lengths of slats are required, one length for completing the clothes cylinder and the other length for forming the cylinder cover. The cutting of these two types of slats of different lengths is provided for by the longitudinal adjustment of the rotary saws 71 and 71' on their common shaft 72. Each type of slat is of course made in large lots so as not to require frequent adjustment of the trimming saws.

The blank $b$ is quickly fed past the rotary saws 71 and 71' by the continuous sliding motion of the feeding cross head 44 and thence is brought into operative engagement with two rotary grooving cutters 81—81' which cut the molding grooves in the ends of the slats $s$ and $s'$. These rotary cutters are disposed immediately behind the rotary saws 71—71' and are mounted on vertical arbors 82, which have bearing support in yoke-shaped frames 83. Each of these yoke-shaped frames has two parallel projecting arms 84 which rest on the cross timbers 34 and 35, and which are slotted longitudinally for the reception of the clamp bolts 85. By loosening these clamping bolts, it will be apparent that the two yoke frames 83 can be adjusted horizontally to separate the rotary cutters or to bring them closer together for the purpose of changing the spacing between the cutters, for operation upon either length of slat, or for regulating the depth of cut in the ends of the slats. The teeth of these cutters are preferably configured to produce a curved V-shaped groove in the ends of the blanks $b$ so as to form the rounded bevels 23 along the end edges of the finished slat.

Each rotary cutter disk is rigidly held between two collars 86, which are clamped over the reduced threaded end of the arbor shaft 82 by the nut 87. Each arbor 82 is journaled in split bearings 88—88 on the yoke ends of the frame 83, and the two arbors are belted together by a round belt 89 which tracks in sheaves 91 mounted on the arbor shafts intermediate these bearings. The arbor of the right hand cutter 81, as viewed in Figure 12 also carries a driving sheave 92, around which is trained the driving belt 93. This driving belt is extended back through the machine and is twisted for engagement over a pulley wheel 94 on the counter shaft 64 (Figure 6).

It is desirable that the rotary cutters 81—81' be vertically adjustable in order to insure that the molding grooves formed thereby will be in the center of the ends of the blanks and in accurate alignment with the lateral molding grooves 25. This vertical adjustment is provided for by the cap screws 101 which thread up into bosses 102 formed on the yoke frames 83. Each cap screw 101 has a short stud end 95 on which is seated a washer 96, of fiber or other suitable material. The fiber washer 96 supports the lower end of the arbor 82 and it will hence be apparent that by manipulating the cap screw the height of the rotary cutter can be adjusted as desired. A lock nut 103 secures the cap screw 101 in any adjusted position. Formed integral with each boss 102 is an enlarged circular oil chamber 104 which contains a reserve quantity of lubricant for lubricating the lower split bearing 88 and the thrust bearing afforded by the end of the cap screw 101.

To prevent any possibility of the blanks $b$ from jumping up above the cross-head 44 or becoming otherwise displaced on the guide rails 39 in either of the preceding sawing and grooving operations, two spring fingers 105 are provided adjacent the rotary saws 71—71'. The spring fingers press down firmly upon each blank as it is fed past the sawing and grooving wheels and resiliently confines the blank in its proper position in front of the cross head 44. Two bowed springs 106 are provided for adding tension to the ends of the spring fingers 105 to insure firm holding of the blank $b$ adjacent the grooving cutters 81—81'. Each spring finger 105 and its respective bowed spring 106 are secured in lapped relation on a block 107 on the back of the hopper 38.

The motion of the reciprocating cross head 44 continues past the grooving cutters 81—81' and as a final step in its operation delivers the trimmed and grooved blank $b$ onto a vertically reciprocable platen bar 112. The cross head 44 is made sufficiently long so that at this period the rear end of the cross head is still closing the bottom of the hopper 38 and retaining the blanks therein. The platen bar 112 is mounted on a plate 113 by bolts 110, the plate 113 in turn being mounted on two reciprocable rods 114, as best shown in Figure 12. The upper ends of the rods 114 thread into bosses 115 formed integral with the plate 113, and are locked therein by the lock nuts 116. The lower ends of the rods 114 carry tappets 117 having bifurcated ends in which are pivoted the tappet rollers 118. These tappet rollers are arranged to cooperate with lifting cams 119 which are keyed to a cam shaft 121. The tappets are retained in vertical alignment with the cams and cam shaft by guide plates 122, which, as shown on the detail view in Figure 13 are provided with slots 123 embracing the cam shaft 121. The guide plates are extended up and are bent across the tops of the tappets 117 where they are secured by the threaded engagement of the lifting rods 114 in the tops of the tappets. Lock nuts 124 lock the guide plates and tappets in the lifting rods 114. The ends of the lifting rods 114 are threaded in opposite directions whereby the height of the platen bar can be readily adjusted by loosening the lock nuts 116 and 124 and rotating the rods 114. Referring to Figure 14, the ends of the plate 113 are bent upward and outward in the form of spring arms 108 which are fastened at their ends to the frame of the machine by screws 109. The spring arms 108 guide the vertical reciprocation of the platen bar 112 and also provide spring means for retracting the platen bar downward and away from the boring mechanism which we shall presently describe. In the latter function, the spring arms are assisted by tension springs 111. These springs lock into eyes in the laterally bent portions of the guide plates 122 and have attachment at their lower ends to a cross strip 120, which is secured to the cross timbers 35.

Figure 17:
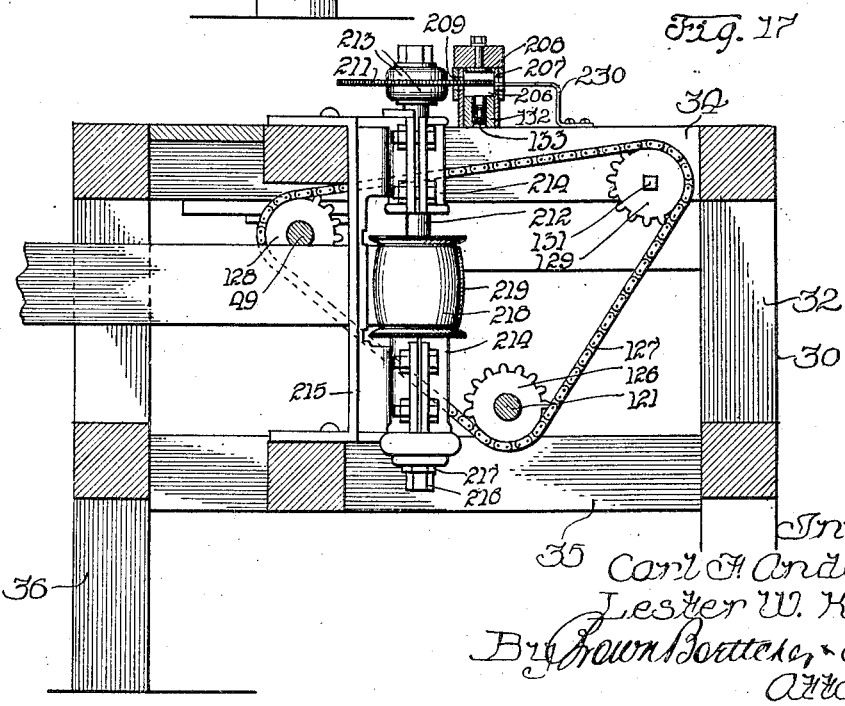
Figure 17 is a transverse sectional view of the machine approximately on the line 17—17 of Figure 12.

The cam shaft 121 has bearing support in a plurality of bearings 125, mounted on the cross timbers 35 and is driven at a relatively slow speed through a sprocket 126 over which is trained a driving chain 127. As shown in Figure 17, the chain 127 is extended up around a sprocket 128 on the countershaft 49, and over a sprocket 129 on a stub shaft 131. The sprocket 128 is driven by the slow speed countershaft 49 and thus drives the other two sprockets 126 and 129. The sprocket 129 connects through the shaft 131 and through a series of gears with a carrier chain for carrying the blanks $b$ from the boring mechanism to the slitting mechanism, as we shall presently describe.

Referring again to Figure 9, it will be noted that the platen bar 112 is guided in its vertical reciprocal motion between the plate 41, and a longitudinal rail 132, of channel section. In the channel formation of the rail 132 lies a carrier chain 133 having a plurality of equidistantly spaced dogs 134 secured thereto whose function is to pick up the blanks as they are pushed over upon the channel rail 132 after being bored on the platen bar 112.

Referring now to the boring operation, the plurality of water circulating holes 18 and the nail holes 19 are all bored simultaneously in the blank $b$ by one reciprocal motion of the platen bar 112. As shown best in Figures 9 and 14, the plate bar 112 is aligned directly beneath a row of closely grouped bit stocks 136 which carry the large boring bits 137 for boring the water circulating holes 18. Each bit stock 136 has an independent driving shaft 138 which is driven by a bevel pinion 139 on the end thereof meshing with a bevel pinion 141 on the main driving shaft 142.

Each bit stock and shaft 139 is journaled in the extending hub portions 143 and 144 of an independent yoke shaped frame 145. The series of yoke frames 145 are all adjustably supported on a mounting plate 146 which is bolted between the two central uprights 33 as shown in Figure 7. The mounting plate 146 is formed with a longitudinal slot 147 through which pass the series of clamping bolts 148, one for each yoke frame 145. On the rear of each yoke frame 145 are formed guiding flanges 149 which embrace the horizontal edges of the mounting plate 146 and guide the yoke frame in horizontal adjusting motion along the plate 146. By the above arrangement it will be apparent that the spacing between the bit stocks can be readily adjusted, and that the number of bit stocks can be easily increased or diminished to change the number of water circulating holes. As we have previously described, the cover slats $s'$ have one less hole than the cylinder slats $s$, and it will hence be apparent from the foregoing how the extra intermediate bit stock is removed and replaced for boring either type of slat.

The nail holes 19 are bored by two relatively small bits 152 which are disposed at each end of the row of bits 137 and are laterally spaced one on each side of the line of bits 137 as clearly shown in Figure 15. At the left hand end the two small bits 152 are adapted for insertion into either of two pairs of parallel bit stocks 153 and 154 aligned across the end of the line of bits 137. At the right hand end of the row the two small bits 152 are always retained in the two spaced stocks 153'. For boring the nail holes 19 in the relatively short cylinder slats, the left hand bits 152 are inserted in the innermost pair of bit stocks 153, and for boring the nail holes 19' in the longer cover slats $s'$ the bits are inserted in the outermost pair of bit stocks 154. This is for the purpose of changing the spacing between the left hand nail holes and the adjacent water circulating hole 18' for reasons concerned with the manufacture of the cylinder covers. All three pairs of bit stocks have short driving shafts 156 which extend up through a supporting housing 157, which is screwed to the outermost yoke frame hub 143, as shown in Figure 15. These housings 157 preferably consist of two split housing sections which are secured together over the shafts 156 by the mounting screws 155. At the upper ends these pairs of driving shafts 156 carry pinions 158 and 159 respectively, the outermost pair of pinions 159 being elevated above and lapping over the innermost pair 158. The pairs of pinions 158 and 159 mesh with gears 161 and 162 respectively, which are rigidly secured to the adjacent driving shaft 138. It will thus be apparent that the small bits 152 rotate continuously with the large bits 157 and, that by merely changing the small bits at the left hand end of the row between the pairs of bit stocks 153 and 154, and removing or replacing one of the intermediate bit stock frames 145, the boring mechanism can be readily adapted to the boring of either type of slat.

To permit of adjustment in the spacing between the bevel gears 141 in accordance with the spacing adjustment between the bit stocks 136, these bevel gears are formed with integral hubs 164 which are slotted longitudinally at a plurality of points as indicated at 165, whereby the hubs can be rigidly clamped to the shaft 142 in any adjusted position by the contraction of semi-circular clamping members 166. The main driving shaft 142 is journaled in bearings 160—160 mounted on upwardly extending legs formed at the ends of the mounting plate 146. The shaft 142 supports a belt pulley 163 on the end thereof, which is driven through a belt 167 extending down to a pulley 168 on the motor driven counter shaft 64.

To prevent displacement of the blank $b$ from the platen bar 112 when the latter carries the blank up into engagement with the boring bits, there are provided two spring fingers 171 (Figures 8 and 9), disposed directly above the platen bar 112 and aligned between the bits 137. These spring fingers are spaced from the platen bar just sufficiently to resiliently hold the blank on the platen bar. The fingers are extended up and over the top of a reciprocating confining bar 172, down behind a backing plate 173, and under the channel rail 132 where the ends are secured between the bosses 115 and lock nuts 116 on the under side of the platen bar 112. The spring fingers 171 consequently have simultaneous reciprocal motion with the platen bar 112. A plate 174 having grooves engaging over the fingers 171, is secured to the backing plate 173 and functions to guide the spring fingers in their vertical motion. The reciprocating confining bar 172 is supported by two metallic straps 175, the upper ends of which are bent over and bolted to the confining bar as indicated at 176' in Figure 8. The straps 175 are extended down adjacent the cam shaft 121 and are converged together to make attachment to an arm 176 depending from the oscillating arm 177. The pivoted oscillating arm 177 comprises the two spaced side members 178 which are pivoted at their forward ends between the two short uprights 180 as indicated at 181 (Figure 7). Between the two side members 178 is pivoted a roller 182 which is adapted to cooperate with a cam 183 on the cam shaft 121. The depending arm 176 is preferably riveted between the spaced side members 178 and has a transverse pin 184 projecting therethrough to which the straps 175 are secured. A tension spring 185 connection with the end of the oscillating arm 177 tends to retain the confining bar 172 in its lowermost position. The function of the bar 172 is to prevent the blanks from jumping the dogs 134 on the carrier chain 133.

The turning of the cam 183 and the length of dwell thereof is so arranged that the bar 172 will descend into proximity to the carrier chain 133 immediately after a bored blank has been discharged onto the chain from the platen bar 112; and will remain in descended position until the carrier chain has conveyed the blank into the enclosed passageway or tunnel 206 for slitting, which latter operation we shall presently describe. This timed relation is such that the bar 172 will be raised and in the clear when the next succeeding blank is discharged from the platen bar 112 onto the carrier chain 133.

The bar 172 moves upwardly just after the completion of the boring operation on the platen bar and just prior to the discharge of the blank therefrom so that there will be ample room to move the blank in under the confining bar. This upward motion of the confining bar 172 is utilized to operate a compressed air jet for blowing the wood pulp produced by the boring bits from off the blank and from off the platen bar and adjacent parts. Referring to Figures 8 and 11, it will be noted that on the stationary plate member 174 is mounted a small air valve 220, which is supported on the plate member 174 by a bracket extension 221. A small pipe 222, extending from a source of compressed air, connects with the intake end of the valve 220. The discharge pipe 223 is extended to the right and is bent around to discharge back along the top of the blank and along the platen bar to blow the wood pulp out from the left hand end of the machine. The valve 220 is operated by a button plunger 224, which projects down in position for engagement by the confining bar 172, when the latter rises after the boring operation. The saw dust and wood pulp from the remaining sawing and grooving operations is preferably removed by the provision of suction hoods adjacent the cutting tools, as is well known in the art.

The operations of boring the blanks b and discharging them from the platen bar 112 are as follows:

The reciprocating cross head 44 first delivers the blank b upon the platen bar 112, forcing the blank in under the upturned ends of the spring fingers 171. The blank is centered properly upon the platen bar in a manner which we shall presently describe. The platen bar is now raised under the action of the cams 119, and the blank b is brought into engagement with the continuously rotating boring bits 137 and 152. It will be noted that the upper surface of the platen bar is formed convex (Figure 9) so as to back up the concave under surface of the blank b and prevent the bits from splitting the same. The platen bar 112 is of course provided with a plurality of bit holes 184, Figure 8, for receiving the ends of the boring bits. Upon descent of the platen bar 112 the blank b is stripped from the boring bits by the spring fingers 171. Concurrently with the time the platen bar has descended to its lowermost position, as shown in Figure 9, the cross head 44 has practically completed the sawing and grooving operations of the next succeeding blank; and at the completion of the stroke of the cross head 44, this latter blank is thrust against the blank on the platen bar, thereby displacing the same and thrusting it over onto the channel rail 132. The displaced blank is thrust up against the backing plate 173 which forms a guide wall for guiding these blanks in their endwise transit on the carrier chain 133. The backing plate 173 is so spaced from the line of bits 137 that when the displaced blank is thrust up against this same plate the blank will function as a positive stop for limiting the motion of the succeeding blank and centering it on the platen bar directly under the line of bits 137. This operation recurs with each blank upon being displaced from the platen bar, and thus each blank after boring functions as a positive stop for centering the next succeeding blank upon the platen bar 112.

The reciprocating cross head 44 is adapted to feed each blank onto the platen bar with a yieldable thrusting motion which will place the two blanks under a slight compression but not of sufficient degree to mar the edges of the blanks. To this end there is interposed a resilient connection in the connecting rod 46, the details of which connection are illustrated in Figure 10. A sleeve-like spring housing 186 is interposed in the connecting rod, this housing having a threaded stud 187 tapping into the upper portion of the connection rod 46. The lower portion of the connecting rod 46' is guided for motion in the spring housing 186 by the guide nut 188 which threads into and closes off the lower end of the housing 186. The end of the lower connecting rod section 46′ is provided with a collar 189, and confined between this collar and the guide nut 188 is a compression spring 191. The throw of the cross head 44 is preferably adjusted so that the two blanks are thrust against the backing plate 173 slightly before the cross head reaches what would normally be the end of the stroke, if its motion were not limited by the blanks, whereby the spring 191 is compressed to the proper degree to insure centering of the rearmost blank on the platen bar. The throw of the cross head 44 can be readily adjusted by the shifting of the pivot bolt 192 in the radial adjustment slot 193, provided in the crank wheel 48.

Referring again to the carrier chain 133, as shown in Figures 8 and 12, it will be noted from the direction arrow that the carrier chain travels from in the rear of the boring mechanism toward the right hand end of the machine. Motion is imparted to the chain by a driving sprocket 194, over which the chain is trained. From the sprocket 194 the chain extends down through the frame and is trained over small pulley wheels 195 secured to the cross timbers 35. From there the chain is passed up over an idling sprocket 196 which has support in a bearing bracket 197 on the frame of the machine, and is from there extended back through the channel rail 133 past the platen bar 112. This chain is preferably of ordinary link construction provided with equidistantly spaced dogs 134 secured to the links for carrying the blanks b along the surface of the channel rail 132. These dogs are preferably so spaced and the chain is so timed that upon discharging a blank from the platen bar 112 onto the channel rail 132 the blank is allowed to remain momentarily before it is engaged by a dog 134, so as to enable the blank to act as a stationary stop for centering the next succeeding blank under the boring bits, as has been previously described.

The driving sprocket 194 is mounted on a short shaft 198 which has support in two bearing blocks 199 which are carried on frame extensions 201. At the end of the shaft 198 is mounted a bevel gear 202 which meshes with a second bevel gear 203 mounted on the stub shaft 131. The shaft 131 has support in a bearing 204 and is extended back under the top of the machine where it carries the sprocket 129 (Figure 17), which, as we have previously described, is continuously driven through the chain 127 from the countershaft 49.

Referring to Figures 8 and 17, it will be noted that the carrier chain 133 passes through a rectangular enclosed passageway 206 extending from adjacent the platen bar 112 to a discharge point out beyond the end of the machine. This enclosed passageway comprises two side members 207 projecting up above the channel rail 132, and the top plate 208 which closes off the top of the passageway. Projecting into the passageway through an opening 209 in the side thereof is a rotary slitting saw 211. This slitting saw is disposed exactly in the center of the vertical dimension of the passageway so as to slit the blank into two complete slats along the median plane of the moulding grooves 25. The rotary slitting saw 207 is mounted on an arbor 212 between collars 213. The arbor 212 is mounted in bearings 214—214 on the yoke shaped frame 215. This yoke shaped frame 215 is of substantially the same construction as the bearing frames 83 for supporting the arbors of the rotary cutters 81—81′, and similarly thereto the frame 215 is arranged to be horizontally adjustable on the frame of the machine to allow adjustment of the horizontal position of the rotary slitting saw in the passageway 206. The arbor 212 is furthermore made vertically adjustable by the provision of the cap screw 216 and a lock nut 217 so as to insure the exact centering of the rotary slitting saw in the passageway 206. The slitting saw 211 is driven by a belt pulley 218 which is carried on the arbor 212 between the bearings 214. A driving belt 219 encircles the pulley 218 and is extended out through the rear of the machine, where it is twisted horizontally and is passed around a pulley 229 on the counter shaft 64. A spreading or separating blade 230 is bolted to the upper surface of the machine and projects into the passageway or tunnel 206 at the rear of the slitting saw 211. This blade separates the finished slat units during the sawing operation and prevents them from binding on the saw 211.

In the operation of the slitting mechanism the blanks b are fed past the slitting saw 211 by the positive feeding action of the dogs 134 in the carrier chain 133. These dogs are sufficiently short so as to amply clear the slitting saw 211. The blank b substantially fills the passageway 206 and hence is confined against any deviating motion which might produce an irregular saw cut. Upon completion of the slitting operation the finished slats are discharged from the end of the passageway 206 into a receptacle or the like at the end of the machine.

Other arrangements and constructions are also possible which would produce the various features of our invention, and we do not, therefore, intend to limit ourselves to the particular constructions and arrangements shown.

We claim:

1. In a machine of the class described, the combination of a substantially horizontal guide member forming a working surface, rotary saw mechanism, rotary cutter mechanism, feeding means for receiving the blanks and feeding them past said rotary saw mechanism and said rotary cutter mechanism, said feeding means having motion on said guide member, each of said blanks being of the size of a plurality of the completed slats, a plurality of boring bits adapted to engage each blank, said feeding means delivering the blanks to position for operative engagement with said boring bits at the completion of the sawing and cutting operations, and slitting means for slitting each of said blanks into the plurality of completed lath units, said rotary cutter mechanism and said slitting means operating in a plane parallel to said working surface and in the same plane with each other.

2. In a machine of the class described, the combination of a pair of spaced rotary saws, a pair of spaced rotary grooving cutters, multiple boring mechanism, slitting mechanism, feeding mechanism, guide means therefor defining a working surface, said rotary grooving cutters and said slitting mechanism operating in a plane parallel to said working surface and in the same plane with each other, said feeding mechanism operating to feed the blanks between said pair of rotary saws for trimming the ends of said blanks, and to feed the trimmed blanks between said pair of rotary grooving cutters for cutting grooves in the trimmed ends of said blanks, said feeding means placing each blank in association with said multiple boring mechanism, means for producing relative motion between said multiple boring mechanism and said blanks for boring a plurality of holes therein, and means for feeding each blank after the trimming, grooving and boring operations to said slitting mechanism for cutting said blanks into a plurality of complete slat units.

3. In a machine of the class described, the combination of a pair of rotary trimming saws, a pair of rotary grooving cutters for cutting grooves in the end edges of the blanks after trimming a hopper for receiving the blanks, an oscillating slide adapted to receive the blanks from said hopper and feed the same successively past said trimming saws and grooving cutters, multiple boring bits, a reciprocating working surface co-operating therewith, said oscillating slide discharging the trimmed and grooved blanks into operative relation with said reciprocating working surface, and means for reciprocating said working surface in timed relation with the oscillation of said slide, whereby one continuous stroke of the oscillating slide will carry the blanks through the trimming and grooving operations and place them singly on said working surface as it moves into position to receive the advancing blank.

4. In a machine of the class described, the combination of a rotary trimming saw, a reciprocating slide for feeding the blanks into operative engagement with said trimming saw, multiple bit boring mechanism for boring a plurality of holes in each of said blanks, a reciprocating platen bar adapted to receive said blanks and move the same into operative engagement with the boring mechanism, said reciprocating slide having a full stroke motion past said trimming saw and discharging each individual blank upon said reciprocating platen bar by a single motion of said slide.

5. In a machine of the class described, the combination of plurality of rotary trimming saws for trimming the blanks, a horizontally reciprocating cross-head adapted to receive said blanks and feed the same by a continuous motion past said trimming saws for operative engagement therewith, multiple bit boring mechanism for boring a plurality of holes in each of said blanks, a reciprocating platen bar associated therewith, said reciprocating cross-head delivering said blanks upon said platen bar at the completion of its operation, said platen bar adapted to bring said blanks into operative engagement with said boring mechanism, and mechanism for cutting each blank into a plurality of complete slat units at the completion of the trimming and boring operations, last said mechanism being disposed in a plane parallel to said cross head.

6. In a machine of the class described, the combination of a pair of spaced rotary trimming saws for trimming the ends of the blanks, a horizontally reciprocating cross head, means for feeding said blanks into position for motion with said cross head, said cross head adapted to feed said blanks between said trimming saws, multiple boring bits for boring a plurality of holes in said blanks, a reciprocating platen bar associated therewith, said cross head having a continuous motion from said feeding means past said trimming saws and delivering said blanks upon said platen bar at the completion of the trimming operation by a single motion of said cross head, the reciprocal motion of said platen bar bringing said blanks into position for engagement by said boring bits.

7. In a machine of the class described, the combination of a substantially horizontal guide member forming a working surface with a reciprocating cross head mounted on said guide, said cross head adapted to have a single motion through a predetermined course of travel, rotary trimming saws at each side of said travel, a hopper for feeding blanks to said working surface at one end of said travel, a multiple drill head at the other end of said travel, a platen bar having movement to advance a blank to said drill head, said movement being timed so that said platen bar will be lowered to receive the advancing blank after being passed through said trimming saws by a single motion of said cross head, and means for slitting the blank into a plurality of slats, said means mounted in a plane parallel to said working surface to slit said blanks substantially in their medial plane.

8. In a machine of the class described, the combination of a rotary grooving cutter for cutting grooves in the edges of the blanks, a traveling feeding member for receiving the blanks and feeding each blank past said grooving cutter for operative engagement therewith, boring mechanism for boring holes in said blanks, each blank being fed into operative association with said boring mechanism after said grooving operation, means for relatively moving said blank and said boring mechanism for boring holes in said blank, and cutting mechanism receiving the blanks from said boring mechanism and operating to divide each of said blanks into a plurality of slat units, said cutting mechanism cutting said blanks, in the plane of the grooves formed in the edges thereof.

9. In a machine of the class described, the combination of a rotary grooving cutter for forming bevels on the blanks, an oscillating slide member for receiving the blanks and feeding the blanks by continuous motion past said grooving cutter for operative engagement therewith, multiple bit boring mechanism for boring holes in said blanks, a reciprocating platen bar for moving said blanks into operative engagement with said boring mechanism, said oscillating slide delivering the grooved blanks onto said reciprocating platen bar, and cutting mechanism for dividing each of said blanks on the line of the bevels in said blanks.

10. In a machine of the class described, the combination of a pair of spaced rotary grooving cutters, a reciprocating cross head adapted to receive the blanks and feed the same between said grooving cutters for operative engagement therewith, multiple boring bits for boring holes in said blanks, a reciprocating platen bar associated therewith, said cross head delivering said blanks upon said platen bar upon completion of the grooving operation, the reciprocal motion of said platen bar moving said blanks into operative engagement with said boring bits, and slitting mechanism receiving the blanks from said platen bar and slitting each of said blanks in a plane transverse to the bored hole therein.

11. In a machine of the class described, the combination of guideways, a reciprocating cross head moving on said guideways, a hopper adjacent one limit of travel of said cross head for feeding the blanks in front of said cross head, said guideways forming a working surface for the blanks, spaced rotary grooving cutters disposed on each side of the course of travel of said cross head, a bank of multiple boring bits adjacent the other limit of travel of said cross head, a reciprocating platen bar associated therewith, said cross head delivering said blanks onto said platen bar at the completion of the grooving operation, slitting mechanism for slitting the blanks, and means for feeding the blanks to said slitting mechanism on a line substantially transverse to the course of travel of said blanks with said cross-head, said slitting means and said grooving cutters acting parallel to said working surface and in planes parallel to each other.

12. In a machine of the class described, the combination of a rotary trimming saw, rotary grooving cutters, a reciprocating slide having motion past said trimming saw and grooving cutters, said slide adapted to receive the blanks and bring them into operative engagement with said saw and with said cutters, multiple boring bits, a working surface therefor, said reciprocating slide discharging said blanks upon said working surface with a single motion, and means for obtaining relative motion between said boring bits and said working surface for boring said blanks.

13. In a machine of the class described, the combination of a plurality of rotary trimming saws, a plurality of rotary grooving cutters for cutting beveled grooves in the end edges of the blanks, means for slitting said blanks through said grooves in a plane substantially parallel to the plane of said rotary grooving cutters, a reciprocating slide moving past said saws and said cutters, means for feeding the blanks into position for motion with said slide, said saws and said cutters operating upon said blanks during their movements by said slide, multiple boring bits for boring holes in said blanks, a reciprocating platen bar cooperating with said boring bits, said slide delivering said blanks upon said platen bar at the completion of the sawing and grooving operation, and means for obtaining relative boring motion between said bits and said platen bar.

14. In a machine of the class described, the combination of a pair of spaced rotary trimming saws, a pair of spaced rotary grooving cutters for cutting beveled grooves in the end edges of said blanks, means acting substantially parallel to the plane of said rotary grooving cutters for slitting said blanks through said grooves which define the plane of separation for division into a plurality of slat units, a reciprocating cross head moving between said saws and said cutters, means for feeding the blanks into position for motion with said cross head, a plurality of boring bits, and a reciprocating platen bar for moving said blanks against said boring bits, said cross head delivering said blanks upon said platen bar at the completion of the sawing and grooving operations.

15. In a machine of the class described, the combination of a pair of horizontal guide rails, a reciprocating cross head moving on said guide rails, a feeding hopper adjacent one limit of the stroke of said cross head, a plurality of vertically disposed boring bits adjacent to the other limit of said stroke, a vertical reciprocating platen bar aligned with said boring bits, a pair of spaced rotary trimming saws disposed one on each side of said guide rails, a pair of spaced rotary grooving cutters disposed one on each side of said guide rails for cutting grooves in both end edges of the blanks, means in the plane of said rotary grooving cutters for slitting said blanks through said grooves which define the plane of separation for division into a plurality of slat units, and adjustable mounting means for said trimming saws and said grooving cutters permitting spacing adjustment between said saws and said cutters.

16. In a machine of the class described, means for cutting the blanks to length, means for grooving said blanks, means for boring said blanks, means for slitting said blanks into slat units after the completion of said cutting, grooving and boring operations, and feeding means for transferring said blanks between said several means.

17. In a machine of the class described, means for trimming the ends of the blanks to slat length, means for grooving the ends of said blanks, means for simultaneously boring a plurality of water circulating holes in said blanks, means for slitting said blanks into complete slat units after the completion of said trimming, grooving and boring operations, and feeding means for transferring said blanks between said different operating means.

18. In a machine of the class described, rotary saw means for trimming the ends of the blanks to slat length, multiple bit boring mechanism for simultaneously boring a plurality of water circulating holes in said blanks, a rotary slitting saw for slitting said blanks into slat units after the completion of said trimming and boring operations, and feeding means for transferring said blanks between said different operating means.

19. In a machine of the class described, rotary grooving cutters for grooving the edges of the blanks, a plurality of boring bits for simultaneously boring a plurality of water circulating holes in said blanks, a rotary slitting saw for slitting said blanks into complete slat units after the completion of said grooving and boring operations, and feeding means for transferring said blanks between said different operating means.

20. In a machine of the class described, means for trimming the ends of the blanks to slat length, means for grooving the ends of said blanks, means for simultaneously boring a plurality of water circulating holes in said blanks, means for slitting said blanks into complete slat units after the completion of said trimming, grooving and boring operations, an oscillating slide for feeding said blanks between said trimming, grooving and boring means, and a continuously moving carrier member for feeding said blanks to said slitting means.

21. In a machine of the class described, rotary trimming saws for trimming the ends of the blanks to slat length, rotary grooving cutters for grooving the ends of said blanks, multiple boring bits for simultaneously boring a plurality of water circulating holes in said blanks, a rotary slitting saw for slitting said blanks into complete slat units after the completion of said trimming, grooving and boring operations, a reciprocating cross head for feeding said blanks to said trimming saws and to said grooving cutters, a reciprocating platen bar co-operating with said boring bits for bringing said blanks into operative engagement therewith, said reciprocating cross head discharging said blanks onto said platen bar, and a continuously moving uni-directional carrier element for feeding said blanks to said slitting saw, said blanks being discharged from said platen bar onto said carrier element.

22. In a machine of the class described, the combination of means for cutting the blanks to length, means for grooving the ends of said blanks, a reciprocating slide for receiving said blanks and bringing them into operative engagement with said cutting and grooving means, boring mechanism for simultaneously boring a plurality of holes in said blanks, a reciprocating platen bar for moving said blanks into operative engagement with said boring mechanism, said reciprocating slide having a complete stroke past said cutting and grooving means whereby to directly deliver said blanks onto said platen bar, and means for centering said blanks upon said platen bar.

23. In a machine of the class described, a plurality of boring bits for simultaneously boring a plurality of holes in the blanks, a reciprocating platen bar for moving said blanks against said boring bits, feeding means for periodically feeding said blanks to said platen bar, means whereby each blank properly centers the next succeeding blank on said platen bar, and conveyor means for receiving each blank from said platen bar after the boring operation.

24. In a machine of the class described, the combination of a plurality of boring bits, a reciprocating platen bar adapted to receive the blanks and move them into position for engagement by said boring bits, a hopper, a reciprocating cross head adapted to receive the blanks from said hopper and feed them onto said platen bar, a connecting member operating to reciprocate said cross head, conveyor means for receiving each blank from said platen bar after the boring operation, stop means for limiting the motion of said blanks whereby the blank on said conveyor means properly centers the next succeeding blank on said platen bar, and resilient means in said connecting member for causing said cross head to resiliently force each blank against the preceding blank on said conveyor means.

25. In a machine of the class described, the combination of a pair of spaced rotary trimming saws for trimming the ends of the blanks, a pair of spaced rotary grooving cutters for grooving the ends of the blanks, a hopper, a reciprocating cross head adapted to receive the blanks from said hopper and feed the same between said trimming saws and said grooving cutters, crank means for reciprocating said cross head, a connecting rod between said crank means and said cross head, a resilient spring connection interposed in said connecting rod, multiple boring bits for simultaneously boring a plurality of water circulating holes in said blanks, a reciprocating platen bar co-operating with said boring bits for moving said blanks into engagement therewith, said cross head delivering said blanks onto said platen bar, stop means operating to limit the motion of said blanks and properly position the same on said platen bar, said resilient spring connection operating through said crosshead to resiliently press said blanks against said stop means, a rotary slitting saw for slitting said blanks into complete slat units, and a carrier for conveying said blanks to said slitting saw, said blanks being discharged from said platen bar onto said carrier.

26. In a machine of the class described, the combination of a plurality of boring bits, a reciprocable platen bar for moving the blanks into and out of operating relation with said boring bits, oscillating feeding means for feeding the blanks onto said platen bar, conveyor means for receiving the bored blanks from said platen bar, and means whereby each succeeding blank displaces the preceding blank from said platen bar to said conveyor means after the same has been bored, and each preceding blank properly centers the next succeeding blank on said platen bar.

27. In a machine of the class described, the combination of mechanism for trimming and boring the blanks, a rotary saw for cutting the blanks into a plurality of slat units by a single simultaneous cutting operation, a feeding element having motion in a substantially horizontal plane for transferring said blanks from the trimming and boring mechanism to said rotary saw, said rotary saw mounted to operate in a plane parallel to the motion of said feeding mechanism, and means for confining said blanks against displacement during the cutting operation by said rotary saw.

28. In a machine of the class described, the combination with a woodworking mechanism for shaping individual blanks to define a line of separation along their end edges for subsequent division into a plurality of slat units, of a rotary slitting saw, and means for causing said blanks to approach said saw with said line of separation in register with the cutting edge of said saw.

29. In a machine of the class described, the combination of mechanism for trimming and boring the blanks, a rotary slitting saw for slitting the blanks into complete slat units, an endless chain for transferring said blanks from said trimming and boring mechanism, lugs on said chain for feeding the blanks past said saw, said chain moving under said saw, and a tunnel chute enclosing said chain and said saw for confining said blanks.

30. The method of making washing machine cylinder slats and the like, which comprises cutting a blank to the length of the finished slats, grooving the edges of said blank, boring a plurality of holes in said blank and then cutting the blank in the plane of said grooves into a plurality of complete slat units.

31. The method of making washing machine cylinder slats or the like in a single wood working machine which comprises taking a blank the size of a plurality of slat units, trimming the blank to one dimension of the finished slat, grooving the blank to form bevels on the finished slat, boring holes in the blank, and then cutting the blank in its medial plane to form a plurality of complete slat units.

32. The method of making washing machine cylinder slats and the like which comprises taking a blank substantially the size of two finished slats, trimming the blank down to the length of the finished slat, grooving the ends of the blank to form beveled edges on the finished slat, simultaneously boring a plurality of water circulating holes and a plurality of nail holes through said blank and then slitting the blank into two complete slat units.

33. The method of making cylinder slats and the like which comprises taking a blank having one dimension of the finished slat unit, trimming the blank to a second dimension of the finished slat, simultaneously boring a plurality of holes in said blank, and then slitting the blank in its medial plane to form a plurality of complete slat units on a plane transverse to the holes bored therein.

34. In a machine of the class described, means for trimming the ends of elongated blanks to slat length, feeding means for feeding each individual blank, transversely into operative relation to said trimming means, means for slitting the blanks into complete slat units, said slitting means acting parallel to said feeding means, and feeding means receiving the blanks from said first feeding means for feeding said blanks to said slitting means, said slitting means acting in a plane parallel to said first feeding means.

35. In a machine of the class described, means for trimming the blanks to one dimension of the finished slat, means for boring a plurality of holes in said blanks, means for slitting each blank into a plurality of slat units in a single slitting operation, and feeding means for transferring said blanks between said different operating means, said slitting means operating in a plane parallel to said feeding means.

36. In a machine of the class described, means for simultaneously boring a plurality of holes in the blanks, a reciprocating table for feeding the blanks to said means, means for slitting each blank into a plurality of complete slat units on a plane transverse to the axis of said holes, and feeding means for transferring said blanks between said boring means and said slitting means, said slitting means operating in a plane parallel to said reciprocating table.

37. In a machine of the class described, means for forming bevels on the blanks, means for slitting each blank into a plurality of complete slat units in a single simultaneous slitting operation, and feeding means for transferring said blanks between said beveling means and said slitting means, said beveling means lying in a plane common to said slitting means.

38. In a machine of the class described, the combination of a plurality of boring bits, a reciprocating working surface adapted to receive the blanks for movement into engagement with said boring bits, a feeding member adapted to receive the blanks from said working surface, and a confining bar moving toward and away from said feeding member for confining said blanks in engagement with said feeding member.

39. In a machine of the class described, the combination of a plurality of boring bits, a reciprocating platen bar adapted to receive the blanks for movement into engagement with said boring bits, a cam shaft having cam means thereon for reciprocating said platen-bar, a rotary slitting saw, a carrier chain adapted to receive the blanks as they are discharged from said platen bar and feed them into engagement with said slitting saw, a confining bar movable toward and away from said carrier chain for confining said blanks in feeding engagement with said carrier chain, and cam means on said cam shaft for actuating said confining bar.

40. In a machine of the class described, the combination of a plurality of boring bits, a reciprocating platen bar for receiving the blank and moving it into engagement with said boring bits, and means for projecting a blast of compressed air along the surface of said blank after the completion of the boring operation.

41. In a machine of the class described, the combination of a plurality of boring bits, a reciprocating platen bar for receiving the blank and moving it into engagement with said boring bits, a carrier chain adapted to receive said blank from said platen-bar, a movable confining bar for confining said blank on said chain, and an air valve operated by the motion of said confining bar, said air valve operating to project a blast of compressed air along the surface of said blank and adjacent said bits for cleaning the same.

In witness whereof we hereunto subscribe our names this 18th day of October, 1919.

CARL F. ANDERSON.
LESTER W. KNAPP.

Certificate of Correction.

It is hereby certified that in Letters Patent No. 1,464,020, granted August 7, 1923, upon the application of Carl F. Anderson, of Brookfield, and Lester W. Knapp, of Berwyn, Illinois, for an improvement in "Woodworking Machines," an error appears in the printed specification requiring correction as follows: Page 11, line 116, claim 31, for the words "its medial plane to form" read *the plane of the grooves into;* and that the said Letters Patent should be read with this correction therein that the same may conform to the record of the case in the Patent Office.

Signed and sealed this 9th day of October, A. D., 1923.

[SEAL.]                                          WM. A. KINNAN,
*Acting Commissioner of Patents.*